W. SHANNON.
AUTOMOBILE STARTING DEVICE.
APPLICATION FILED MAR. 24, 1913.
1,123,940.
Patented Jan. 5, 1915.
2 SHEETS—SHEET 2.
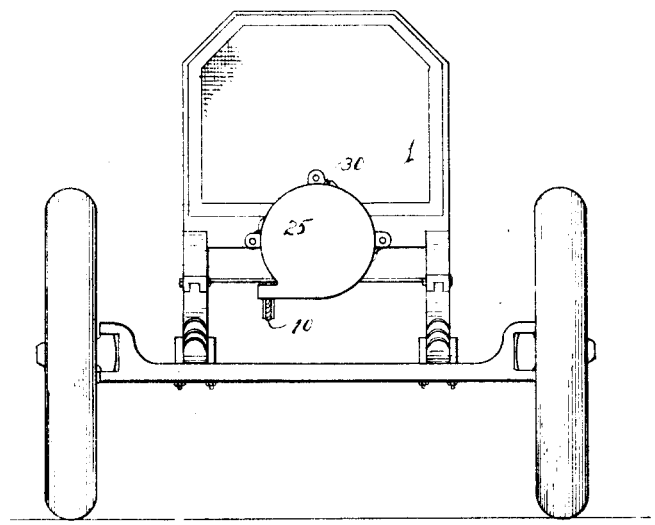
*Fig. 3*
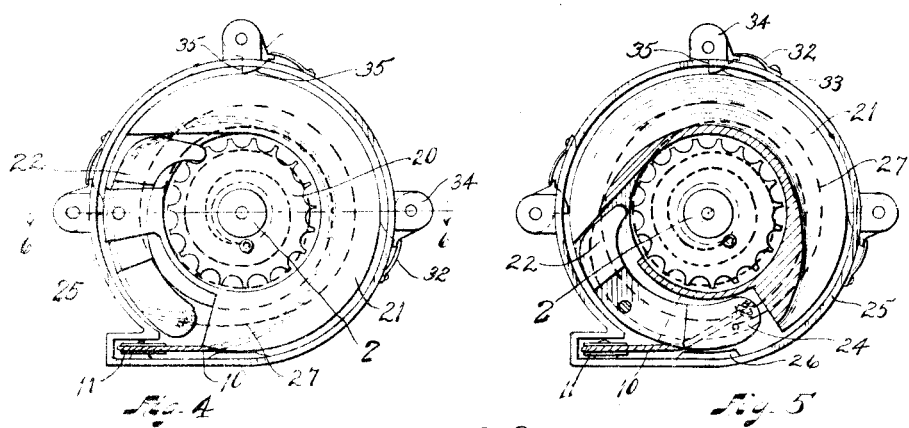
*Fig. 4*  *Fig. 5*
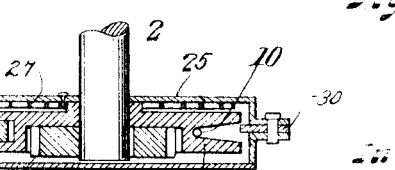
*Fig. 6*
Witnesses:
Inventor
William Shannon
by Albert H. Bates
Attorney

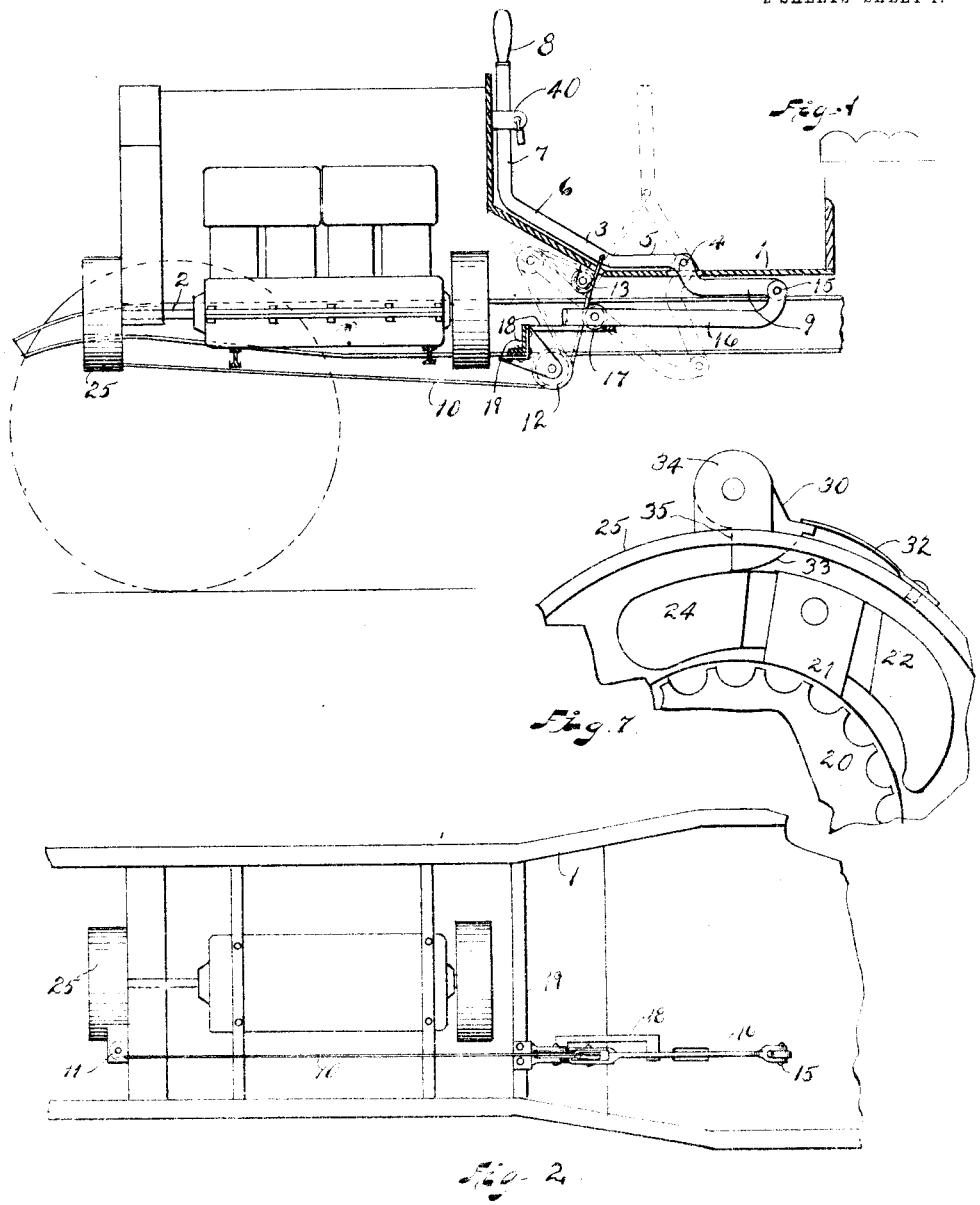

UNITED STATES PATENT OFFICE.

WILLIAM SHANNON, OF EAST CLEVELAND, OHIO.

AUTOMOBILE STARTING DEVICE.

1,123,940. Specification of Letters Patent. Patented Jan. 5, 1915.

Application filed March 24, 1913. Serial No. 756,342.

*To all whom it may concern:*

Be it known that I, WILLIAM SHANNON, a citizen of the United States, residing at East Cleveland, in the county of Cuyahoga and State of Ohio, have invented a certain new and useful Improvement in Automobile Starting Devices, of which the following is a full, clear, and exact description, reference being had to the accompanying drawings.

The object of this invention is to provide a simple and effective mechanism for starting an automobile from the seat of the driver.

My mechanism saves all the trouble of getting out of the machine to crank it at the front end, as is customary, saves the danger from back-firing, and is much simpler and cheaper, and more reliable than the so-called self starters on the market.

The invention comprises broadly, a lever accessible to the driver in his seat, a ratchet mechanism operating on the engine shaft, and connecting mechanism between the lever and ratchet mechanism so that, when the lever is operated, the engine shaft will be rotated to turn over the engine.

The invention includes also special features of the mechanism by which the leverage is ready to start when it is needed, and then after the movement is started, the speed of rotation is increased for a given lever movement, thus giving the shaft the desired turning.

The ratchet mechanism is hereinafter described and a means for preventing any disastrous effects from back-firing is also included in my invention.

In the drawings, Figure 1 is a sectional side elevation of a portion of an automobile equipped with my starting device; Fig. 2 is a bottom plan of the portion of the automobile showing the course of the connecting mechanism between the lever and the ratchet mechanism; Fig. 3 is a front elevation of an automobile showing the position of my starting device in front of the radiator; Fig. 4 is a front elevation of the ratchet mechanism with the cover removed and showing the ratchet at the beginning of the stroke of the hand lever; Fig. 5 is a similar view showing the position of the parts at the finish of the stroke, some of the parts being sectioned for clearness of illustration; Fig. 6 is a section taken on the line 6—6 of Fig. 4; Fig. 7 is a detail of the parts for preventing disastrous effects from back-firing.

As shown in the drawings, 1 indicates the front portion of an automobile comprising the driver's seat, the dash board and the foot space between them.

2 indicates the shaft of the engine.

3 indicates the lever of my starting device. This lever is pivoted at 4 on the floor of the car and extends along the floor, as shown at 5 and then inclines forwardly, as shown at 6, and then upwardly, as at 7, terminating in a hand hold 8, which normally stands adjacent to the dash board. From the pivot 4 the lever 3 extends downwardly through the floor and then rearwardly, as at 9, which stands normally adjacent the under side of the floor.

On the forward end of the car is a ratchet mechanism, to be hereinafter described, which, when rotated will turn the shaft of the engine. This mechanism is operated by a cable, chain, or other flexible member running from the ratchet mechanism to the lever 3. This flexible connection is shown at 10 in the drawing. It runs from the ratchet mechanism rearwardly over the pulleys 11, 12 and 13 and is anchored at this end to the lever a short distance from the pivot 4. Pivotally secured at 15 to the end 9 of the lever 3 is a link 16 extending forwardly, and carrying at its free end a sheave 17, which bears against the cable 10 between the pulleys 12 and 13. The forward end of the link may rest on a suitable support 18 carried by the cross member 19 on which the pulley 12 is carried. This rest guides the link 16 up past the foot board to clear the fly wheel and other parts of the engine. When the lever 3 is drawn rearwardly to operate the ratchet mechanism at first it obtains a direct pull on the cable 10, but, as the movement progresses, the link 16 moves forwardly, and its movable pulley diverts the cable so that the cable is effectively drawn rearwardly more rapidly than the movement of the lever 3. Thus, at the start, one has the full power of the lever, but, as the movement progresses, the rotation given thereby is increased in speed where less power is necessary. This gives the desired easy starting and rapid rotating action to the shaft.

The ratchet mechanism consists of a wheel 20 having notches in its periphery carried on the forward end of the engine shaft. Adjacent to this wheel 20 is a second wheel 21 carried loosely on the shaft and having a recess in one side, in which the wheel 20 stands. A portion of the wheel 21 is cut away at its periphery to admit a dog 22, which is pivoted at 23, to this wheel 21, and is adapted to engage the teeth on the periphery of the wheel 20. The dog 22 is somewhat arcual in form and it is intermediately pivoted. The cable 10 is attached to the end opposite the nose of the dog. The dog 22 stands normally out of engagement with the wheel 20 and is only brought into engagement with this wheel when the cable 10 is pulled. The wheel 21 is provided with a suitable groove about its periphery to guide the cable 10. This groove is made much deeper near the nose of the dog as will be seen from Fig. 5 so that a pull on the cable forces the nose of the dog into engagement with the notches of the wheel 20. The deepening of the groove shortens the length of the stroke of the lever 3 required to rotate the engine shaft, and also acts to quicken the movement of the ratchet mechanism after the beginning of the stroke. Carried on the inner face of the housing 25 is an abutment 26 which engages the end 24 of the dog and holds the nose of the dog out of engagement with the wheel 20 when the device is in starting position. The leverage is so selected that, when the lever is given a full movement, the wheel 21 is given one rotation about the shaft and, accordingly, at one end of the movement of the lever, the dog again is moved out of its engagement with the wheel 20 by means of the end 24 of the dog coming into engagement with an abutment 26. A coiled spring 27 surrounds the engine shaft 2 and is attached to the casing 25 and to the end 24 of the dog and acts to return the wheel 21 to the position shown in Fig. 5 while drawing on the cable 10 to return the lever 3 to its normal position shown in Fig. 1. This spring exerts a pull on the end 24 of the dog and tends to keep the nose of the dog out of engagement on the return movement of the lever. It is only necessary to give the lever 3 one full movement to the rear to give the engine shaft a complete rotation, and as many successive movements of the lever may be made as desired. Thus, all of the cylinders of the engine may be charged in securing a starting much more effectively than the old scheme of cranking to charge a single cylinder.

By operating the starting mechanism from the seat, the operator may set the spark so that there is little danger of back-firing, but, should back-firing take place, no harm would result, for it would simply draw the lever against the dash board. The operator has simply to let go of the lever, and he is free from injury, and a suitable bumper on the dash board receives the impact. However, I have provided special mechanism to prevent back firing from even throwing the lever against the dash board. This I accomplish by providing on the wall of the housing 25 a series of pawls 30, carried by ears 34, which are pressed by springs 32 toward the axis of the shaft. These pawls act idly on the dog 22 as it rotates in the starting direction under the pull of the cable 10. But on the return movement each pawl depresses the end 24 of the dog and insures it being out of engagement with the wheel 20. Accordingly, any back-firing that could take place would only turn the wheel 21 rearwardly a portion of a rotation, until the dog 22 engages one of the pawls 30 when it would be disengaged from the wheel 20. In the drawings, three of these pawls are shown arranged ninety degrees apart. They are pivoted to ears 34 on the casing 25 and have a shoulder 35 abutting the casing 25 to prevent rocking backwardly and a cam surface 33 engaging the dog on its return movement. As the wheel 21 turns the dog forwardly when the cable 10 is pulled, the dog passes idly across these pawls, but, should back-firing occur, the rotation of the shaft can only carry the wheel 21 with it until the dog engages one of the pawls, or the stationary abutment 26, for, in that case, the dog is normally forced out of contact with the wheel 20. Accordingly, any back-firing, even if it should occur, would only give a slight movement to the operating lever, whereas on the starting of the engine or on the usual return movement of the dog after failure to start on first attempt, the nose is held out of engagement by the spring 27 as heretofore described, and the dog merely passes the pawls without engaging them.

I prefer to provide on the dash board a pair of ears 40 between which the lever 3 normally stands. A padlock having its loop inserted through these ears will lock the lever and effectively prevent starting of the car. This provides a very simple lock for the automobile.

My device is very simple in construction; there is nothing about it to get out of order; it is effective in service, and has the further advantage that it may be easily applied to existing automobiles of various types.

Although I have described my device in connection with an automobile I do not limit myself to its use on automobiles, but may use it as a starting device for motors of motor boats or any explosion engine not easily accessible for starting.

Having thus described my invention, what I claim is:

1. In an automobile starting device, the combination with an engine shaft, of a notched wheel on the engine shaft, a rotary member surrounding said wheel and having a dog adapted to engage the notches, a fixed member adjacent the shaft, a spring coiled about the shaft and having one end attached to the dog and the other end to said fixed member, and acting to press the dog out of engagement with the wheel, a lever accessible to the driver, and connecting mechanism between the lever and the rotary member.

2. In a starting device, the combination with an engine shaft, of rotary mechanism adapted to drive the engine shaft, a lever, a flexible member directly attached to the lever and connected with the rotary mechanism, said flexible member being moved by the movement of the lever, a movable pulley adapted to act on said flexible member between the lever and the rotary mechanism, and means whereby the lever bodily moves the movable pulley to give additional movement to the flexible member.

3. In a starting device, the combination with an engine shaft of a lever, a movable pulley, a link connecting the same with the lever, a flexible member connected at one end to the lever and passing across the movable pulley, and a device for turning over the engine shaft connected to the other end of said flexible member.

4. In a starting device, the combination with an engine shaft, of ratchet mechanism adapted to engage the engine shaft and turn the same over when said mechanism is given a rotation, a flexible member connected at one end with said mechanism and adapted to give it a rotation, a lever to which the other end of said flexible member is anchored, means for increasing the speed of rotation for a given lever movement consisting of a movable sheave bearing against the flexible member between the lever and ratchet mechanism, and a connection between said movable sheave and the operating lever.

5. The combination, with an engine shaft, of a wheel thereon, a rotary carrier, a dog carried by the carrier and adapted to engage the wheel, a pivoted operating lever, a cable or other flexible member attached to the lever above its pivot and connected to the rotary carrier and passing across suitable pulleys on stationary axes, and a movable pulley bearing against the cable between two of the stationary pulleys and means carried by the lever below its pivot for bodily moving the movable pulley when the lever is operated to give an increased pull on the cable.

6. In an automobile starting device, the combination with an engine shaft, of a lever pivoted adjacent to the floor of the automobile and accessible to the driver in his seat, and a cable connected at one end to said lever and leading forwardly, two adjacent pulleys across which the cable runs, a movable pulley acting on the cable between the pulleys first mentioned, a link carrying the movable pulley and connected to said lever, and means for turning over the shaft connected with the cable at its forward end.

7. The combination with an engine shaft carrying a notched wheel, a rotary carrier, a dog carried thereby adapted to engage said wheel, a spring tending to force said dog out of engagement with the wheel and tending to return the dog and carrier to normal position after being rotated, a housing surrounding the dog and carrier, an abutment on the housing for forcing the dog out of engagement with the wheel, and means for rotating the carrier.

8. The combination with an engine shaft carrying a notched wheel, a rotary carrier, a dog carried thereby adapted to engage said wheel, a spring tending to force said dog out of engagement with the wheel and tending to return the dog and carrier to normal position after being rotated, a housing surrounding the dog and carrier, an abutment on the housing for forcing the dog out of engagement with the wheel, and means for rotating the carrier comprising a lever conveniently accessible to the operator, and a flexible connection between the lever and dog whereby the carrier may be rotated when the upper end of the lever is pulled rearwardly.

9. In a starting device, the combination with the engine shaft, of a notched member on the engine shaft, a rotary carrier having a pawl adapted to engage said member, a flexible member attached to the pawl and tending to draw it into engagement with the notched member, means for drawing on said flexible member at will, and means to free the pawl from the notched member on a return movement of the pawl consisting of a plurality of pawls carried on a housing surrounding the carrier and the shaft and adapted to engage the pawl if it is in engagement with the wheel.

10. The combination with an engine shaft carrying a notched wheel, of a fixed member around the shaft, a rotary carrier having a grooved periphery, a dog on the carrier intermediately pivoted, a cable for turning over the engine shaft guided by such groove and attached to the dog so that it engages the notched wheel when the cable is pulled, and a spring coiled about the shaft having one end attached to the fixed member and the other end to the dog, tending to return the carrier and to draw the dog out of action.

In testimony whereof, I hereunto affix my signature in the presence of two witnesses.

WILLIAM SHANNON.

Witnesses:
 ALBERT H. BATES,
 BRENNAN B. WEST.